United States Patent
Hasegawa et al.

(10) Patent No.: US 9,819,250 B2
(45) Date of Patent: Nov. 14, 2017

(54) MAGNET INSERTING APPARATUS FOR MAGNET INSERTION INTO MAGNET INSERTION SLOTS OF ROTOR CORE

(71) Applicant: NISSAN MOTOR CO., LTD., Yokohama-shi, Kanagawa (JP)

(72) Inventors: Kiyoshi Hasegawa, Yokohama (JP); Takumi Ohshima, Yokohama (JP); Yasushi Matsushita, Yokohama (JP); Akihisa Hori, Yokohama (JP); Michito Kishi, Atsugi (JP); Takashi Sekikawa, Yokohama (JP)

(73) Assignee: Nissan Motor Co., Ltd., Yokohama-shi, Kanagawa (JP)

(*) Notice: Subject to any disclaimer, the term of this patent is extended or adjusted under 35 U.S.C. 154(b) by 0 days.

(21) Appl. No.: 14/783,257

(22) PCT Filed: Mar. 18, 2014

(86) PCT No.: PCT/JP2014/057252
§ 371 (c)(1),
(2) Date: Oct. 8, 2015

(87) PCT Pub. No.: WO2014/167953
PCT Pub. Date: Oct. 16, 2014

(65) Prior Publication Data
US 2016/0049851 A1    Feb. 18, 2016

(30) Foreign Application Priority Data

Apr. 10, 2013    (JP) .................................. 2013-082227

(51) Int. Cl.
*H02K 15/02* (2006.01)
*H02K 15/03* (2006.01)
*H02K 1/27* (2006.01)

(52) U.S. Cl.
CPC ............. *H02K 15/03* (2013.01); *H02K 1/276* (2013.01)

(58) Field of Classification Search
CPC ............................... H02K 15/03; H02K 1/276
See application file for complete search history.

(56) References Cited

U.S. PATENT DOCUMENTS 3,847,269 A * 11/1974 Buccicone ......... B65G 21/2018
                                                          198/679
5,705,970 A *  1/1998 Nishida ................. H01F 1/0558
                                                          335/303

(Continued)

FOREIGN PATENT DOCUMENTS

DE    102008018724 A1    10/2009
JP        09-163649 A     6/1997

(Continued)

*Primary Examiner* — Minh Trinh
(74) *Attorney, Agent, or Firm* — Young Basile Hanlon & MacFarlane, P.C.

(57) ABSTRACT

A magnet inserting apparatus into magnet insertion slots of a rotor core is configured to arrange a guide tape (a belt-shaped member) along an inner wall surface of the magnet insertion slot, and the guide tape having a coefficient of friction smaller than that of the inner wall surface of the magnet insertion slot. The magnet inserting apparatus is configured to insert the magnet parts into the magnet insertion slot, the guide tape (the belt-shaped member) being arranged on the inner wall surface of the magnet insertion slot.

5 Claims, 12 Drawing Sheets

(56) References Cited

U.S. PATENT DOCUMENTS

2004/0046469 A1* 3/2004 Oshima .................. H02K 1/276
                                                    310/156.21
2016/0049851 A1* 2/2016 Hasegawa .............. H02K 15/03
                                                    29/598

FOREIGN PATENT DOCUMENTS

JP          2012-039746 A     2/2012
WO          2001-095460 A1    12/2001

* cited by examiner

MAGNET INSERTING APPARATUS FOR MAGNET INSERTION INTO MAGNET INSERTION SLOTS OF ROTOR CORE

CROSS REFERENCE TO RELATED APPLICATION

The present application claims priority to Japanese Patent Application No. 2013-082227 filed on Apr. 10, 2013, all of which is incorporated herein by reference.

TECHNICAL FIELD

The present invention relates to a technique for inserting a magnet into a magnet insertion slot of a rotor core.

BACKGROUND

A technique has been known from the past of using a long plate-shaped magnet formed by integrating a plurality of divided magnet parts, as a magnet to be inserted into magnet insertion slots of a rotor core of a motor (see WO2001/095460A). By forming the magnets to be inserted into the magnet insertion slots with the plurality of magnet parts as mentioned above to reduce volume of the individual magnet parts, it is possible to reduce the eddy current generated by the variation of an acting magnetic field.

Since a large cost is incurred for bonding the plurality of the magnet parts to form the long plate-shape, a method is considered for cost reduction in which a bonding process of the plurality of the magnet parts is omitted and a plurality of the magnet parts is inserted into the magnet insertion slots of the rotor core as it is.

However, if an attempt is made to insert the magnet parts into the magnet insertion slots of the rotor core as they are, the weight of one magnet part is smaller as compared with a case in which the long plate-shaped magnet is inserted, and thus dropping energy at the time of magnet insertion will become smaller by the same amount. Consequently, this leads to a problem that when a magnet part contacts a side wall of the magnet insertion slot, the magnet part would tilt in its pose due to friction resistance thereof and the magnet part would readily be caught up in the middle of the magnet insertion slot.

SUMMARY

An object of the present invention is to provide a technique for smoothly inserting magnetic parts when inserting the magnet parts into magnet insertion slots of a rotor core, while preventing the magnet parts from becoming caught up in the middle of the magnet insertion slots.

According to one embodiment, there is provided a magnet inserting apparatus into magnet insertion slots of a rotor core is configured to arrange a belt-shaped member along an inner wall surface of the magnet insertion slot, and the belt-shaped member having a coefficient of friction smaller than that of the inner wall surface of the magnet insertion slot. The magnet inserting apparatus is configured to insert the magnet parts into the magnet insertion slot, the belt-shaped member being arranged on the inner wall surface of the magnet insertion slot.

The embodiments of the present invention and the advantages of the present invention will be described in detail below with reference to accompanying drawings.

DESCRIPTION OF THE EMBODIMENTS

Figure 1:
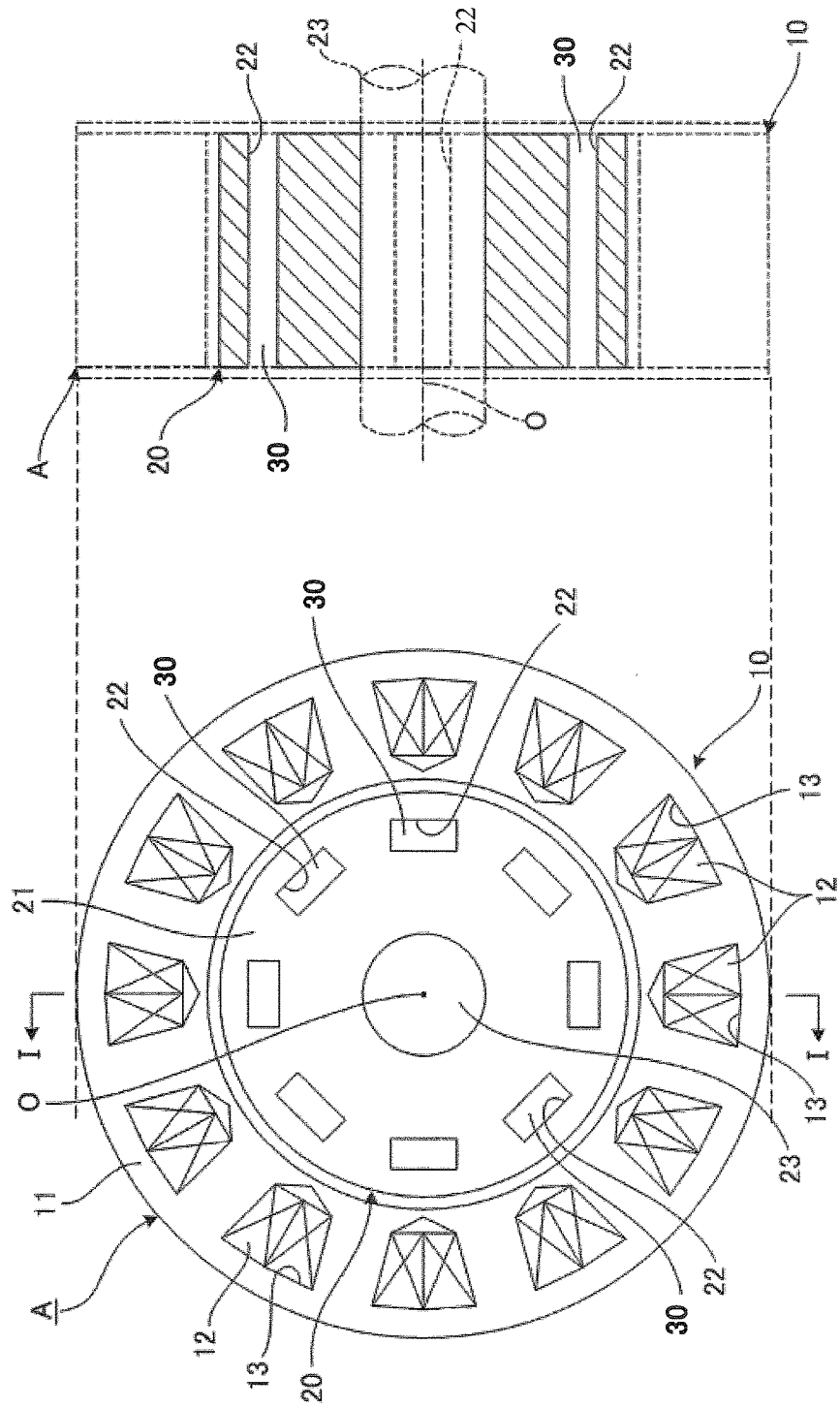
FIG. 1 is a schematic view of a configuration showing an essential part of a rotating electrical machine including a rotor into which magnets are inserted into a magnet insertion slot of a rotor core by means of a magnet inserting apparatus of the present embodiment.

FIG. 1 is a schematic view of a configuration showing an essential part of a rotating electrical machine including a rotor into which magnets are inserted into magnet insertion slots of a rotor core by means of the magnet inserting apparatus in the present embodiment. In FIG. 1, the drawing on the left side is a cross-section view of the rotating electrical machine, and the drawing on the right side is a side view thereof. The rotating electrical machine AA includes a stator 10 shaped as a circular ring configuring a portion of a casing not shown in the drawing, and a pillar-shaped rotor 20 disposed concentrically with the stator 10. The rotating electrical machine AA is, for example, an electric motor, and is used as a driving source for electric automobiles and hybrid automobiles. However, the rotating electrical machine may also be a generator, and use thereof is not limited to an automobile.

The stator 10 includes a stator core 11 and a plurality of coils 12. The plurality of the coils 12 is accommodated in slots 13 formed in the stator core 11, which slots 13 are provided in intervals of equal angles along one circumference whose center serves as a shaft center O.

The rotor 20 includes a rotor core 21, a rotation axis 23 which rotates integrally with the rotor core 21, and a plurality of field pole magnet bodies 30. The plurality of the field pole magnet bodies 30 is accommodated in magnet insertion slots 22 formed in the rotor core 21, which magnet insertion slots 22 are provided in intervals of equal angles along one circumference whose center serves as the shaft center O.

Figure 2:
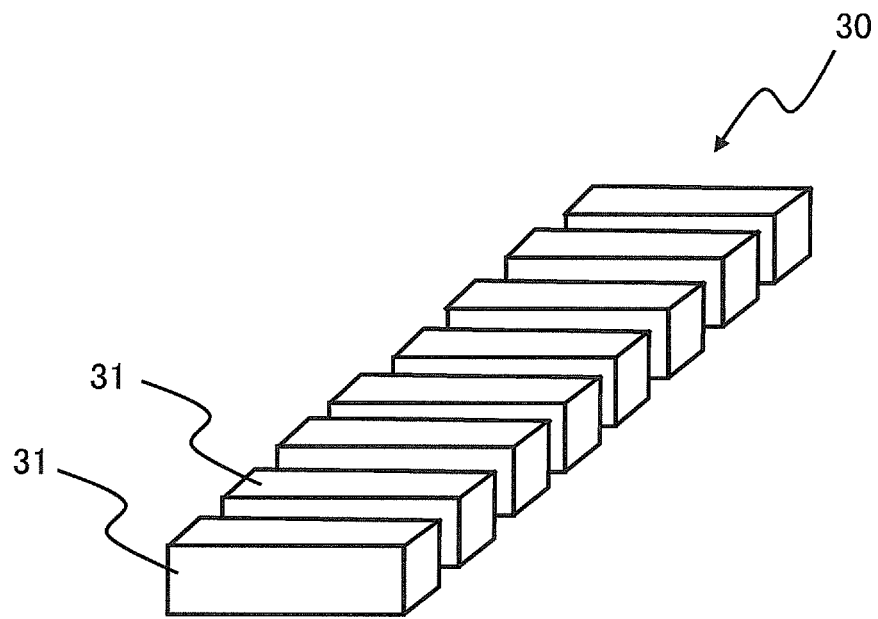
FIG. 2 is a view showing a plurality of magnet parts to be inserted into the magnet insertion slot.

As shown in FIG. 2, the field pole magnet body 30 to be accommodated in the magnet insertion slot 22 of the rotor 20 is configured as a cluster of magnet parts 31 aligned in one row obtained by bonding, with resin, a plurality of the magnet parts 31 cut and divided from a long plate-shaped magnet body 30. However, as will be discussed later, the field pole magnet body 30 will be inserted into the magnet insertion slot 22 in the cut and divided state of the magnet parts. Then, in the state in which all of the magnet parts 31 are inserted into the magnet insertion slot 22, all of the magnet parts 31 are integrated as one in the magnet insertion slot 22 by using resin.

Next, explanation will be made as to the method of inserting the plurality of the magnet parts 31 into the magnet insertion slot 22 by using the magnet inserting apparatus for magnet insertion into the magnet insertion slots of the rotor core of this embodiment, using FIG. 3 to FIG. 12. The plurality of the magnet parts 31 are inserted one by one into the magnet insertion slots 22 of the rotor core 21, which magnet insertion slots 22 are arranged in the direction of the rotation axis of the rotor 20. However, the number of the magnet parts to be inserted at a time may be 2 or more.

Figure 3:
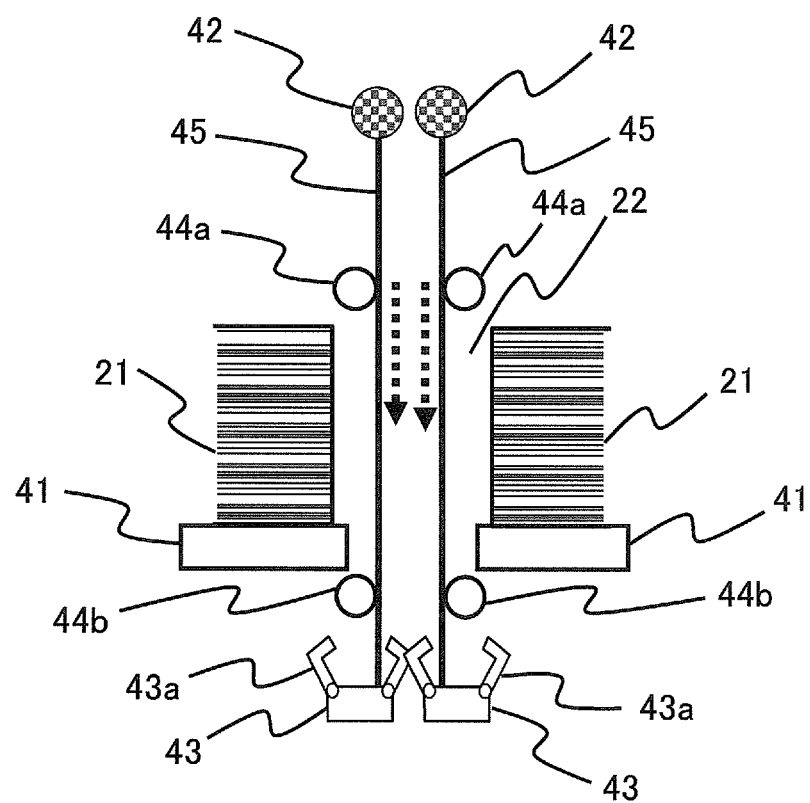
FIG. 3 is a view explaining a process of sending out two guiding tapes from guiding tape sending/receiving apparatuses to guiding tape clampers.
Figure 4:
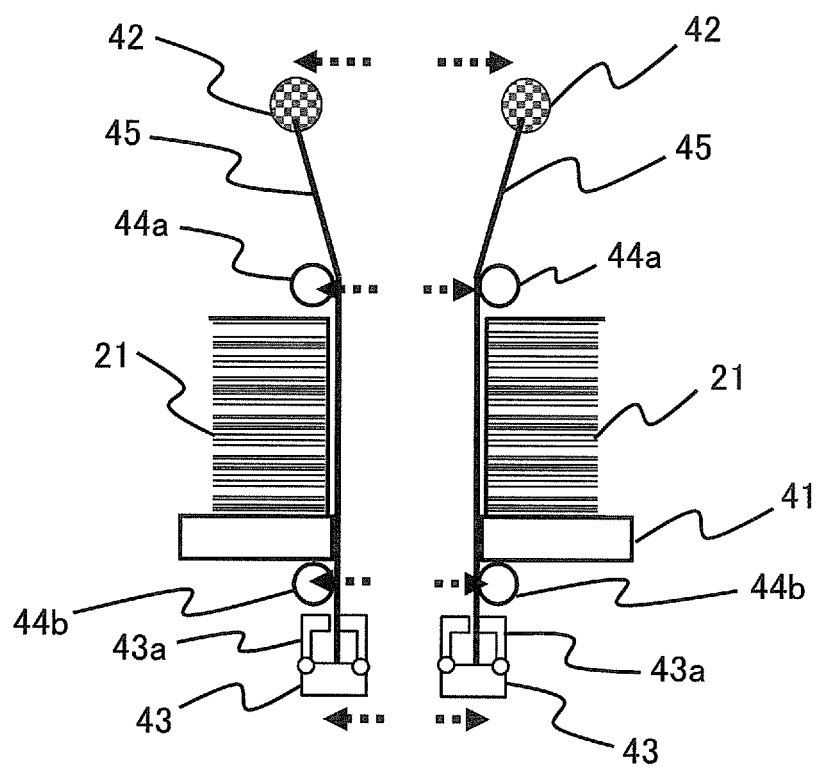
FIG. 4 is a view explaining a process of expanding the guiding tapes sideways.

At first, the rotor core 21 is set on a rotor core supporting plate 41 (see FIG. 3). The rotor core supporting plate 41 has a hole whose size is smaller than that of the magnet insertion slot 22 of the rotor core 21.

Guiding tape sending/receiving apparatuses 42 are set above the magnet insertion slots 22 and guiding tape clampers 43 are set below the magnet insertion slots 22, and two guiding tapes 45 are sent out from the guiding tape sending/receiving apparatuses 42 toward the guiding tape clampers 43. In more details, a pair of guiding tape positioning rollers 44a is arranged above the magnet insertion slot 22 and a pair of guiding tape positioning rollers 44b is arranged below the magnet insertion slot 22, and two guiding tapes 45 are sent out so that the guiding tapes pass along inner sides of the pair of the guiding tape positioning rollers 44a and 44b (see FIG. 3).

As the guiding tape 45, a tape is used that uses a substance having a coefficient of friction smaller than that of an inner wall surface of the magnet insertion slot 22, for example, a fluorinated resin tape, and also that is so thin that it can be fitted in a space between the magnet parts 31 and the rotor core 21 in a state in which the magnet parts 31 are inserted into the magnet insertion slot 22 (a tape having a thickness of about several ten microns).

Meanwhile, the guiding tape 45 is used to prevent the magnet parts 31 from being caught up in the middle of the magnet insertion slot 22 and be smoothly inserted into the slot, and therefore, it is not limited to a tape as long it is a belt-shaped member having a coefficient of friction smaller than that of the inner wall surface of the magnet insertion slot 22. Accordingly, a member such as a metal shim, which is used in a space gauge, may also be used.

The guiding tape clamper 43 is provided with a guiding tape clutch 43a configured to pinch and immobilize the guiding tape 45. The guiding tape 45 can be pinched and immobilized by closing the guiding tape clutches 43a. In a state in which the guiding tapes 45 are immobilized by the guiding tape clutches 43a, the guiding tape sending/receiving apparatuses 42, the guiding tape clampers 43, and the guiding tape positioning rollers 44a and 44b are moved to expand sideways from each other until the guiding tapes 45 contact a wall constituting the hole of the rotor core supporting plate 41 (see FIG. 4).

Especially, the guiding tape sending/receiving apparatuses 42 are moved to positions on outer sides of the guiding tape positioning rollers 44a, thereby forming a taper shape wherein an upper portion of the guiding tapes 45 are gradually arranged expanding outward from the guiding tape positioning rollers 44a.

Figure 5:
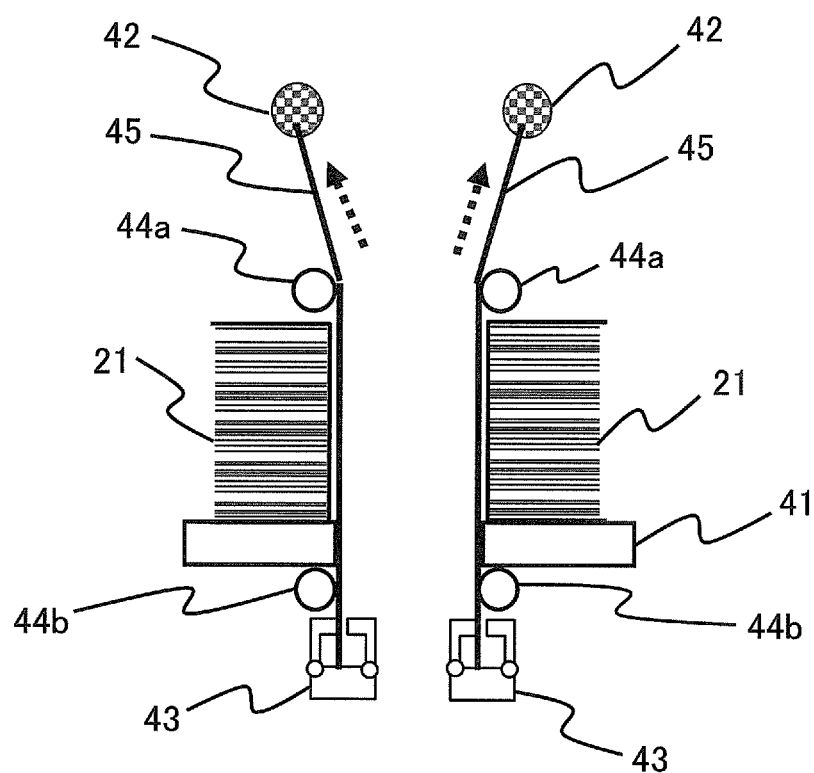
FIG. 5 is a view explaining a process of applying tension by slightly winding the guiding tape.

Then, in order that the guiding tapes 45 do not bend loose in the magnet insertion slot 22, a tension is applied to the guiding tapes 45 by slightly winding the guiding tapes 45 by means of the guiding tape sending/receiving apparatuses 42 (see FIG. 5). In this way, the guiding tapes 45 are arranged along the inner wall surface of the magnet insertion slot 22. The guiding tape sending/receiving apparatus 42 and the guiding tape clamper 43 constitute a belt-shaped member arranging unit for arranging the guiding tape 45 along the inner wall surface of the magnet insertion slot 22.

Figure 6:
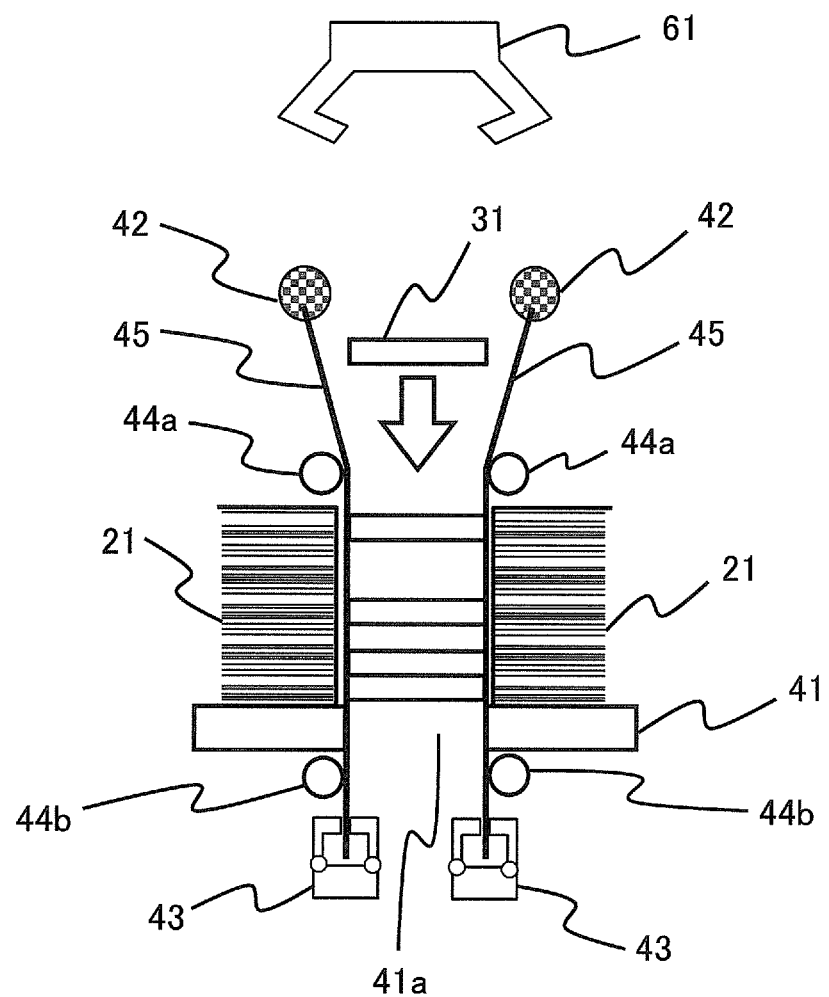
FIG. 6 is a view explaining a process of carrying the magnet parts above the magnet insertion slot and then dropping them between the two guiding tapes.

Then, the magnet parts 31 are carried above the magnet insertion slot 22, and then dropped between the two guiding tapes 45 (see FIG. 6). FIG. 6 shows an example that the magnet parts 31 are dropped after being carried above the magnet insertion slot 22 by means of a magnet part inserting apparatus 61 having the magnet parts 31 in a pinched state. As mentioned above, the upper portion of the guiding tapes 45 are arranged in a taper-shaped manner, the guiding tapes 45 gradually expanding outward as it ascends, and therefore, the magnet parts 31 can be readily dropped to the magnet insertion slot 22 without requiring a high accuracy positioning. As methods for carrying the magnet parts 31 above the magnet insertion slot 22 and dropping them therefrom, there are methods such as using a simple robot as like the magnet parts inserting apparatus 61 as shown in FIG. 6 and a sloping shooter.

As mentioned above, the rotor core supporting plate 41 has a hole 41a whose size is smaller than that of the magnet insertion slot 22 of the rotor core 21, and therefore, the inserted magnet parts 31 remain on the rotor core supporting plate 41. Accordingly, the plurality of the magnet parts 31 thus inserted are stacked on the rotor core supporting plate 41, in the magnet insertion slot 22 (see FIG. 6).

Figure 7:
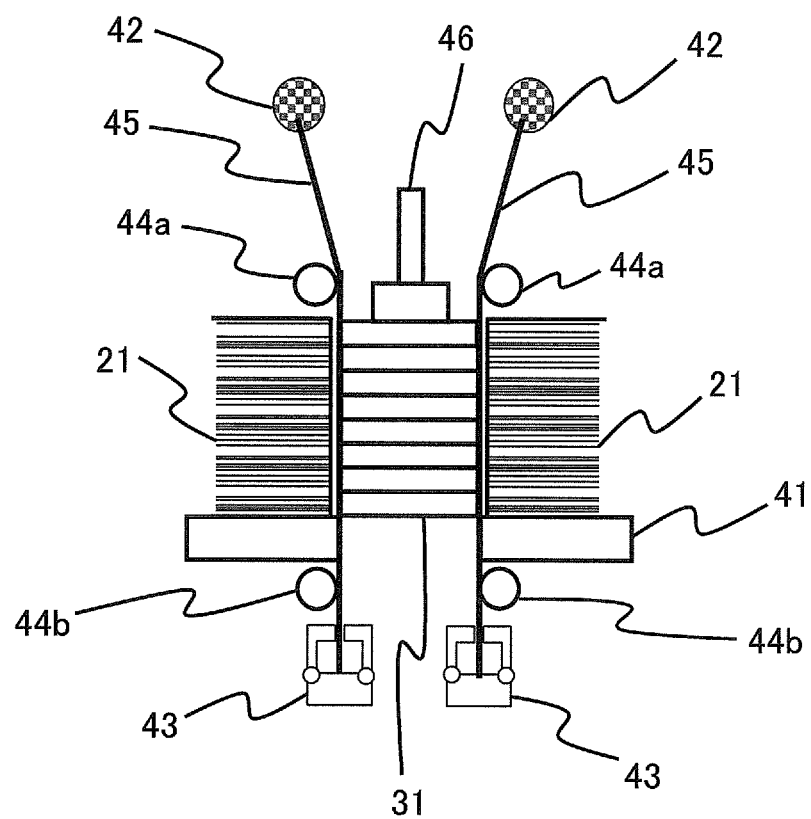
FIG. 7 is a view explaining a process of pressing down an upper end surface of the uppermost magnet part of a plurality of stacked magnet parts by using a magnet pressing rod.

After all the magnet parts are inserted, an upper end surface of the uppermost magnet part 31 of the plurality of the stacked magnet parts 31 is pressed from the top by using a magnet push rod 46 (see FIG. 7). This is conducted to prevent the magnet parts 31 positioned between the two guiding tapes 45 from being lifted up when the guiding tapes 45 are removed in the next process. Accordingly, it is not necessary to strongly press the magnet parts 31 with the magnet push rod 46.

Figure 8:
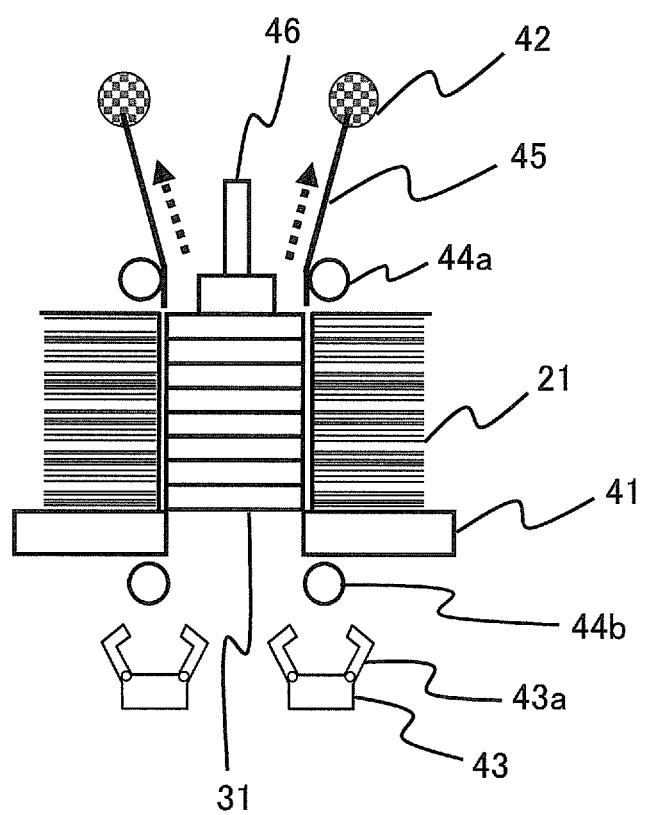
FIG. 8 is a view explaining a process of removing the guiding tapes from inside the magnet insertion slot.

Next, the guiding tape clutches 43a of the guiding tape clampers 43 are opened, and the guiding tape sending/receiving apparatuses 42 are actuated to remove the guiding tapes 45 from inside the magnet insertion slot 22 (see FIG. 8).

Figure 9:
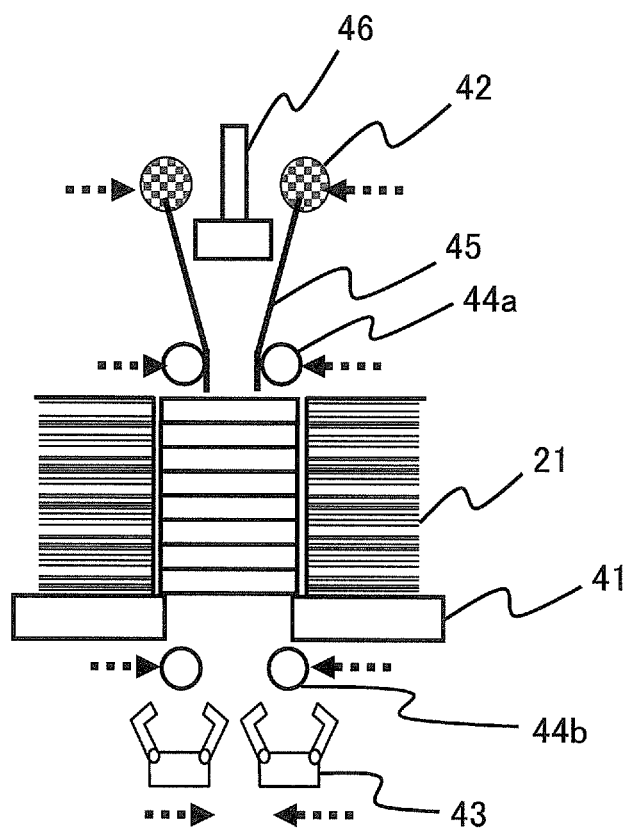
FIG. 9 is a view explaining a process of lifting the magnet pressing rod.

Finally, the magnet push rod 46 is lifted (see FIG. 9). Meanwhile, the guiding tape sending/receiving apparatuses 42, the guiding tape clampers 43, and the guiding tape positioning rollers 44a and 44b are returned to their respective initial positions.

When all the magnet parts 31 are inserted into the magnet insertion slot 22 of the rotor core 21, a treatment to fix the magnet parts 31 in the magnet insertion slot 22 by a resin molding is executed, in the resin molding process of the next step. Meanwhile, in order to prevent the magnet parts inserted into the magnet insertion slot 22 from falling down, the rotor core supporting plate 41 is transported together with the rotor core 21 when the rotor core 21 is transported to the magnet resin molding process.

Modification examples thereof will be explained hereafter.

Figure 10:
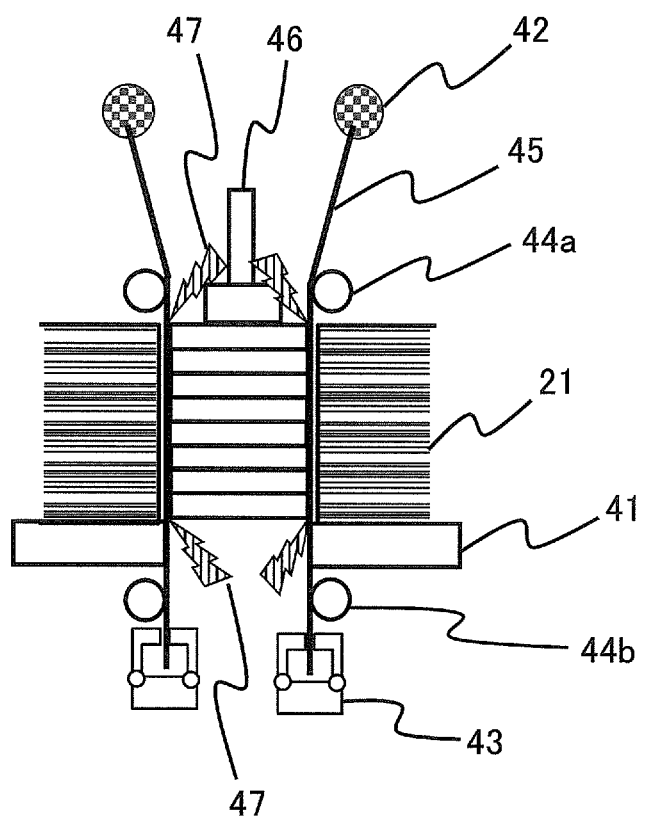
FIG. 10 is a view showing an example in which the guiding tapes are not removed but cut by using a laser cutter.

FIG. 10 is a view showing an example in which the guiding tapes 45 are not removed but cut, by using a laser cutter that uses a laser beam 47. In the example shown in FIG. 10, the guiding tapes 45 are cut at positions upper of and lower of the magnet insertion slot 22. In this method, although cut guiding tapes 45 remain between the plurality of the magnet parts 31 and the rotor core 21 in the magnet insertion slot 22, no particular problem is caused therefrom and thus the cut guiding tapes 45 are left as they are.

Figure 11:
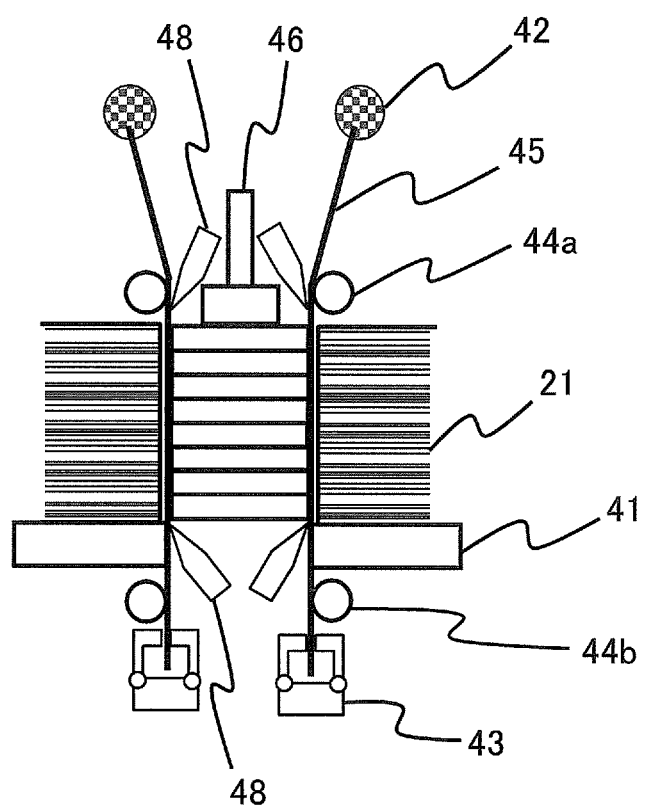
FIG. 11 is a view showing an example in which the guiding tapes are not removed but cut by using a knife cutter.

FIG. 11 is a view showing an example in which the guiding tapes 45 are not removed but cut, by using a knife cutter 48. In this example also, the guiding tapes 45 are cut at positions upper of and lower of the magnet insertion slot 22, and the guiding tapes 45 remain in the magnet insertion slot 22.

Meanwhile, the method for cutting the guiding tape 45 is not limited to the methods of using a laser cutter or a knife cutter.

Figure 12:
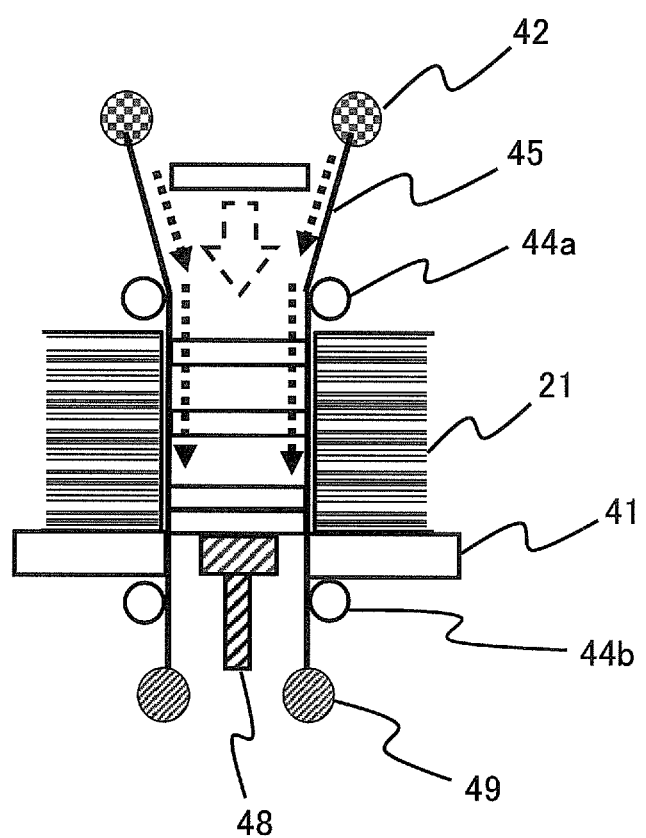
FIG. 12 is a view explaining a method for inserting a plurality of the magnet parts into the magnet insertion slot by using force generated when drawing the guiding tapes.

FIG. 12 is a view explaining a method for inserting the plurality of the magnet parts 31 into the magnet insertion slot 22 by using force generated when drawing the guiding tapes 45 downward. Meanwhile, although the plurality of the magnet parts 31 are supported by the magnet part receiving rod 48 to prevent the magnet parts 31 from falling down from the magnet insertion slot 22 in the example shown in FIG. 12, if the magnet parts 31 can be supported by the rotor core supporting plate 41, the magnet part receiving rod 48 will not be necessary.

In this method, when the magnet parts 31 are dropped inside the two guiding tapes 45 upon carrying the magnet parts 31 above the magnet insertion slot 22, the guiding tapes 45 are drawn downward by the guiding tape sending/receiving apparatuses 49 that are disposed below the magnet insertion slot 22. The guiding tape sending/receiving apparatuses 49 include a clamping mechanism for pinching and immobilizing the guiding tape 45.

In the method shown in FIG. 12, the magnet parts 31 are inserted into the magnet insertion slot 22 when the guiding tapes 45 are drawn downward, by utilizing the friction force generated by the magnet parts 31 and the guiding tapes 45 contacting with each other. Accordingly, a tape formed by a material having a high coefficient of friction is used for the guiding tape 45 used in this method, so that the magnet parts 31 can be inserted into the magnet insertion slot 22 by utilizing the friction force. After all the magnet parts 31 are inserted into the magnet insertion slot 22, the guiding tapes 45 are cut as explained in FIG. 10 and FIG. 11.

As discussed above, according to the magnet inserting apparatus for magnet insertion into the magnet insertion slots of the rotor core in one embodiment, belt-shaped members having a coefficient of friction smaller than that of the inner wall surface of the magnet insertion slot 22 (guiding tapes 45) are arranged along an inner wall surface of the magnet insertion slot 22, and the magnet parts 31 are inserted into the magnet insertion slot 22 in which the belt-shaped members (guiding tapes 45) are arranged on the inner surface thereof. In this way, when inserting the magnet parts 31, it is possible to prevent any catching up of the magnet parts in the middle of the magnet insertion slot 22. In addition, even if the inner wall of the magnet insertion slot 22 has an uneven surface, the magnet parts 31 can be inserted smoothly without receiving the effect of the surface unevenness.

Moreover, because the magnet parts 31 can be smoothly inserted, there is no need to chamfer the corner of the magnet parts 31, and thus the chamfering procedure can be omitted. In addition, chamfering of the corners of the magnet part 31 would cause a decrease in performance of the magnet due to the reduced volume of the magnets, however, no such problem would occur.

In addition, the belt-shaped member (guiding tape 45) is arranged in a taper-shaped manner so that an upper portion thereof is arranged gradually expanding outward, and the magnet parts 31 are inserted from the upper portion of the belt-shaped member arranged in the taper-shaped manner; this allows for the magnet parts 31 to be inserted without carrying out high accuracy positioning with respect to the magnet insertion slot 22. In this way, the magnet inserting apparatus for magnet insertion into the magnet insertion slots of the rotor core can be manufactured in low costs, thus enabling the reduction in cost for manufacturing a motor.

Moreover, because the belt-shaped members (guiding tapes 45) are removed upon insertion of all the magnet parts 31 into the magnet insertion slot 22, the belt-shaped members thus removed can be reused, which thus allows for the reduction in cost for manufacturing a motor.

In addition, the belt-shaped members (guiding tapes 45) may be cut at an upper end portion and a lower end portion of the magnet insertion slot 22 upon insertion of all the magnet parts 31 into the magnet insertion slot 22. In the method of removing the belt-shaped members, there is a possibility that the belt-shaped members would become caught up or cut in the middle. However, by cutting the belt-shaped members, it is possible to prevent the catching up or cutting of the belt-shaped members.

Moreover, the apparatus may be configured such that the belt-shaped members (guiding tapes 45) are drawn downward when the magnet parts 31 are inserted into the magnet insertion slot 22, and the magnet parts 31 are inserted into the magnet insertion slot 22 by using friction force generated between the magnet parts 31 and the belt-shaped members when the belt-shaped members are drawn downward. According to this method, it is possible to more securely insert, into the magnet insertion slot 22, the magnet parts 31 that have light weights and thus a small dropping energy.

The present invention is not limited to the one embodiment mentioned above, and various modifications and applications thereof are possible.

The invention claimed is:

1. A magnet inserting apparatus for inserting magnet parts into magnet insertion slots of a rotor core of a motor, each one of the magnet insertion slots having an inner wall surface with a first coefficient of friction with respect to the magnet parts, the magnet inserting apparatus comprising:
    a flat belt-shaped member having a second coefficient of friction with respect to the magnet parts, the second coefficient of friction is smaller than the first coefficient of friction to prevent a magnet part of the magnet parts, being inserted into the one magnet insertion slot adjacent a flat side of the flat belt-shaped member, from being caught in the magnet insertion slot;
    an arranging unit including:
        a guiding tape apparatus placed above a magnet insertion slot; and
        a guiding tape clamper placed below the magnet insertion slot, wherein the arranging unit is configured to arrange the flat belt-shaped member along the inner wall surface of the magnet insertion slot by coupling a first end of the flat belt-shaped member to the guiding tape apparatus and a second end of the flat belt-shaped member to the guiding tape clamper; and
    a magnet part inserting unit configured to insert the magnet parts into the magnet insertion slot.

2. The magnet inserting apparatus according to claim 1, wherein the flat belt-shaped member is formed in a taper-shaped manner so that an upper portion thereof is gradually expanded outward, and wherein the magnet part inserting unit inserts the magnet parts from the upper portion of the flat belt-shaped member formed in the taper-shaped manner.

3. The magnet inserting apparatus according to claim 1, wherein the arranging unit removes the flat belt-shaped member after all the magnet parts are inserted into the magnet insertion slot.

4. The magnet inserting apparatus according to claim 1, further comprising:
   a cutting unit configured to cut the flat belt-shaped member at an upper end portion and a lower end portion of the magnet insertion slot after all the magnet parts are inserted into the associated one of the magnet insertion slots.

5. The magnet inserting apparatus according to claim 1, further comprising:
   a belt-shaped member drawing unit configured to draw the flat belt-shaped member downward when the magnet parts inserting unit inserts the magnet parts into the associated one of the magnet insertion slots,
   wherein the magnet parts are inserted into the magnet insertion slot by using a friction power generated between the magnet parts and the flat belt-shaped member when the flat belt-shaped member is drawn downward by the belt-shaped member drawing unit.

* * * * *